United States Patent
Crayford

[19]

[11] Patent Number: 5,943,206

[45] Date of Patent: Aug. 24, 1999

[54] CHIP TEMPERATURE PROTECTION USING DELAY LINES

[75] Inventor: Ian Crayford, San Jose, Calif.

[73] Assignee: Advanced Micro Devices, Inc., Sunnyvale, Calif.

[21] Appl. No.: 08/914,263

[22] Filed: Aug. 19, 1997

[51] Int. Cl.[6] .................................................. H02H 5/04
[52] U.S. Cl. ........................................ 361/103; 327/262
[58] Field of Search ................... 361/103, 93, 1, 361/25; 327/262, 276

[56] References Cited

U.S. PATENT DOCUMENTS

| | | | |
|---|---|---|---|
| 4,980,586 | 12/1990 | Sullivan et al. | 307/591 |
| 5,132,572 | 7/1992 | Woo | 307/475 |
| 5,187,632 | 2/1993 | Blessing | 361/103 |
| 5,220,216 | 6/1993 | Woo | 307/469 |
| 5,227,679 | 7/1993 | Woo | 307/469 |
| 5,264,745 | 11/1993 | Woo | 307/475 |
| 5,349,612 | 9/1994 | Guo et al. | 375/118 |
| 5,363,419 | 11/1994 | Ho | 375/120 |
| 5,367,542 | 11/1994 | Guo | 375/110 |
| 5,400,370 | 3/1995 | Guo | 375/118 |
| 5,451,894 | 9/1995 | Guo | 327/241 |
| 5,452,333 | 9/1995 | Guo et al. | 375/371 |
| 5,457,336 | 10/1995 | Fang et al. | 257/322 |
| 5,457,719 | 10/1995 | Guo et al. | 375/373 |

*Primary Examiner*—Sally C. Medley

[57] ABSTRACT

A temperature protection device determines the operating temperature of an integrated circuit chip. The temperature monitor includes a delay line made up of serially connected delay cells. The propagation time of a signal through the delay cells is determined and this value is correlated to chip temperature. The chip temperature is compared to an operating range for the chip, and if the value is outside a predetermined range, an alert signal is produced.

25 Claims, 3 Drawing Sheets

CHIP TEMPERATURE PROTECTION USING DELAY LINES

RELATED APPLICATIONS

This application is related to co-pending application to Ian Crayford entitled CHIP TEMPERATURE MONITOR USING DELAY LINES, U.S. patent application Ser. No. 08/914,262, commonly assigned with the present invention.

FIELD OF THE INVENTION

This invention relates to monitoring temperature conditions of semiconductor devices and more particularly to taking protective measures when the temperature of an integrated circuit chip is outside a predetermined range.

BACKGROUND OF THE INVENTION

In an integrated circuit chip, the various functions performed by the logic elements on the chip are dependent on variations in chip operating conditions. These chip operating conditions include the chip operating temperature. Chips are often contained in enclosures which experience extreme variations in temperature that can lead to poor chip performance, faulty data or even chip failure. When a chip fails to perform properly or crashes, the resulting failure could cause other connected chips or systems to output erroneous results or crash. This potential cascading failure may further cause loss of valuable processing time or the loss of important data. Complex recorders may be used to store information on the operating state of the chip before the failure and are used to determine potential causes of the failure.

A drawback with such recorders is that they are unable to prevent a chip failure. In addition, these recorders often contain complex analog sensors or fast analog-to-digital (A/D) converters which are sensitive to noise caused by digital switching operations and other factors. Hence, a need exists for providing a temperature protection device that can respond to temperature conditions above or below the operating threshold of a chip. It is additionally desirable to provide a temperature protection device using digital logic elements that can provide different responses based on the actual chip temperature and can be integrated into a digital design.

SUMMARY OF THE INVENTION

A primary object of the invention is to monitor the operating temperature of an integrated circuit chip and provide chip protection when the chip temperature is outside its operating range.

Another object of the invention is to protect the chip using digital logic elements that can be integrated into a digital design.

A further objective is to provide a centralized system-wide protection mechanism which may protect many components of an overall system, not just the chip or device in which the monitoring/detection resides.

To achieve the foregoing and other objects and advantages, the present invention utilizes a delay line comprising a plurality of serially connected delay cells. The delay cells have a characteristic propagation, delay time which varies with temperature. A counter is coupled to the delay line for measuring propagation time of a signal through the delay line. A temperature detector converts this delay time into a signal representative of chip operating temperature. A temperature comparator determines whether the temperature is outside a predetermined operating range.

In accordance with one aspect of the invention, each delay cell comprises a pair of serially connected inverters.

In a further aspect of the invention, a chip shutdown device coupled to the comparator shuts down chip logic functions when the chip temperature is outside the predetermined operating range.

In another aspect, a control system is coupled to the comparator and performs predetermined control functions depending on the chip temperature.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings and description are to be regarded as illustrative in nature, and not as restrictive.

DETAILED DESCRIPTION OF THE INVENTION

Figure 1:
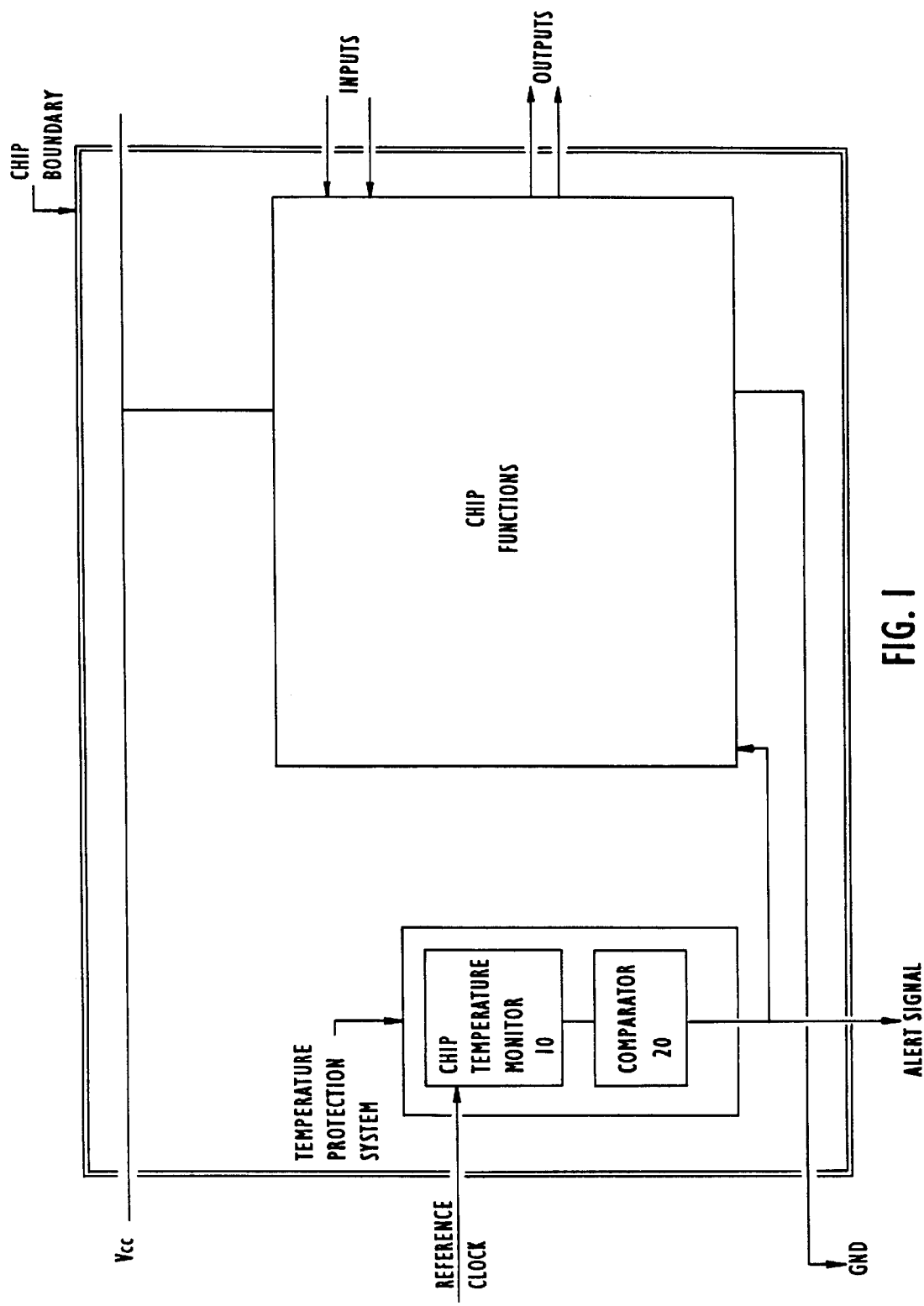
FIG. 1 is a block diagram of a chip temperature protection system.

FIG. 1 shows a functional block diagram of a chip temperature protection system. In the exemplary embodiment, the temperature protection system comprises a chip temperature monitor 10 and a comparator 20 located on the same silicon substrate and having close physical proximity to the chip logic functions. Therefore, the logic elements within the chip temperature monitor 10 are subjected to the same temperature conditions as the chip logic functions. Alternatively, the chip temperature protection system may be a separate entity located in close physical proximity to a chip's logic functions.

The chip temperature monitor 10 is supplied with a clock input signal. This clock input signal is shown supplied from an off-chip source, but may be supplied from an on-chip source which can provide a logic "high" input to the chip temperature monitor 10. The voltage of the input signal should be kept constant.

Chip temperature monitor 10 determines the chip operating temperature and outputs this value to comparator 20. Comparator 20 compares the current temperature to a predetermined operating range of temperatures. If the current temperature is outside the predetermined operating range, an alert signal is output to other devices. Details of the chip temperature protection system are shown in FIG. 2.

Figure 2:
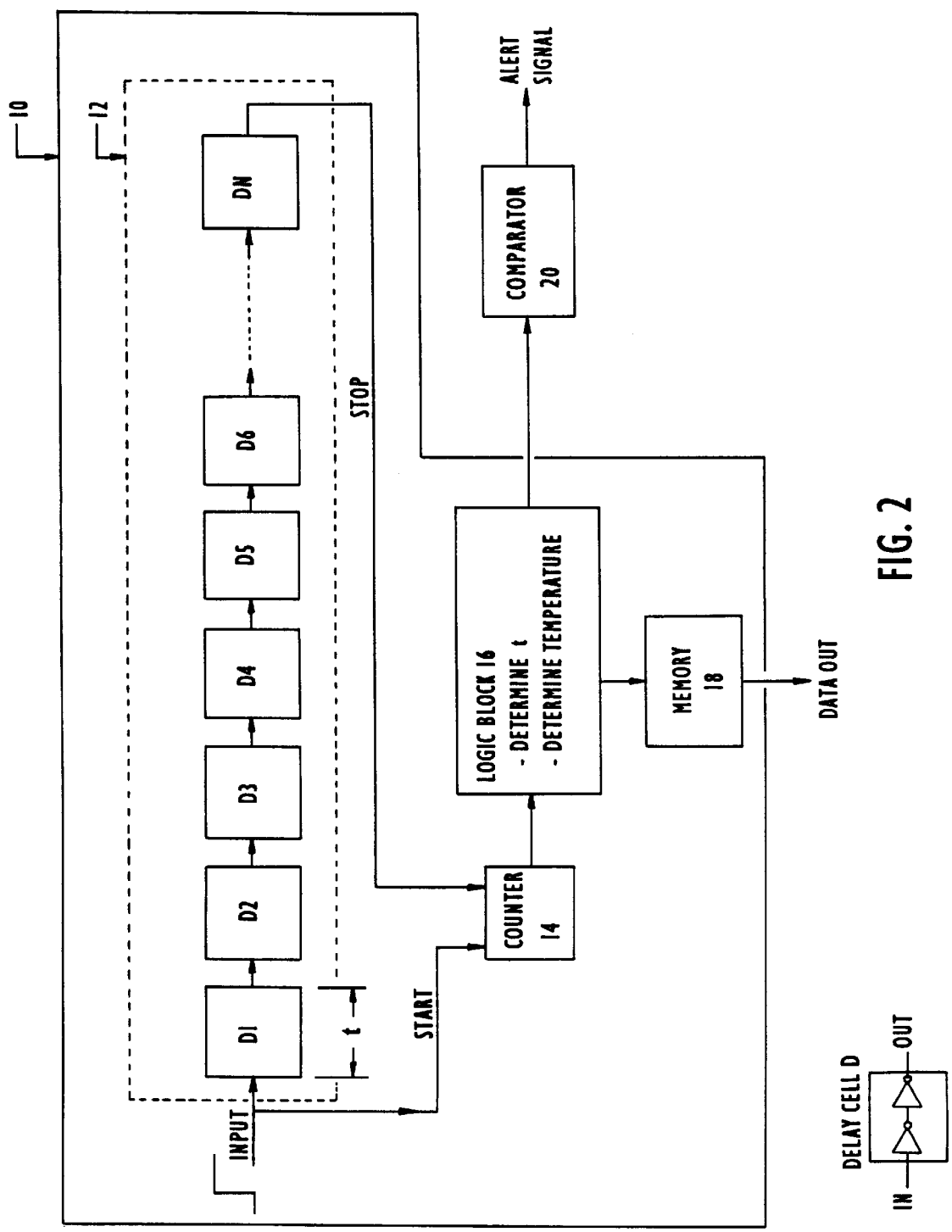
FIG. 2 is a detailed block diagram of the chip temperature protection system of FIG. 1.

With reference to FIG. 2, the chip temperature monitor 10 comprises a delay line 12, shown outlined by dashed lines. Each of the individual delay cells D comprises a pair of serially connected inverters. The propagation delay time of the delay cells varies with temperature.

As CMOS and other processing technologies provide greater density of devices on chips, long strings of cascaded inverters can be obtained at lower and lower cost and the inverters can be used as the basic high resolution unit delay element. However, other logic elements may also be used as the basic delay element without departing from the concept of the invention. Examples of cascaded inverters used as high resolution delay elements are in U.S. Pat. Nos. 5,451,894 and 5,457,719, both assigned to the assignee of the present invention.

The number of delay cells N in delay line 12 is chosen by the system designer and is dependent on the desired accuracy of the chip temperature monitor 10. For example, the greater the number N, the less the error will be in determining the delay time of each delay cell.

The counter 14 receives a start input from the input tap of the delay line at the input to D1 and begins counting. The counter 14 continues counting until the output stop signal from the output tap of the delay line at DN stops the counter 14. The counter 14 contains a value which is equal to the propagation time of a signal through N delay cells. The counter 14 outputs this value to logic block 16. Logic block 16 divides the total propagation time t, received from the counter, by N, where N is the number of serially connected delay cells in the delay line 12. The result of this calculation is the actual propagation delay time of a single delay cell at the current temperature. Alternatively, the counter 14 may include logic to perform the calculations performed by logic block 16.

The counter 14 can be any one of many conventional counter devices which are known in the art. The counter is shown on-chip, but alternatively could be located off-chip. In addition, there are many alternative ways to determine the propagation delay time t of the delay cells.

One alternative delay cell timing mechanism includes a delay line oscillator. Using the known propagation delay time t for standard operating conditions, a system designer builds an oscillator by cascading N delay cells together to generate a clock signal with a known period. In order to determine the actual propagation delay of the delay cells based on the particular temperature conditions on the chip, a frequency comparator compares the output of the delay line oscillator to an external reference clock with a known frequency. By comparing the two clock signals, the actual propagation time t can be easily calculated.

The delay cells in the delay line 12 may be assigned addresses, as described in U.S. Pat. No. 5,457,719, assigned to the assignee of the present invention. This use of addressing enables logic block 16 and counter 14 to quickly know the length of the delay line and facilitates calculations made by logic block 16 or counter 14.

As discussed earlier, as the temperature of the chip changes, the propagation delay time of the delay cells changes. Logic block 16 determines the chip operating temperature from the actual propagation time t. Logic block 16 contains a table of stored temperatures which correlate to various propagation times. For example, it may be known that a propagation time of 140 picoseconds for a single delay cell corresponds to a temperature of X° Celsius (C) at a constant voltage. Logic block 16 stores the information that a delay time of 140 picoseconds corresponds to a chip temperature of X° C. Therefore, whenever the propagation time of a signal through a single delay cell is found to be 140 picoseconds, logic block 16 outputs a temperature value of X° C. to comparator 20. Alternatively, logic block 16 may simply provide an indication that can be read from an external device to indicate the current temperature to a pre-assigned designated accuracy and/or time period.

The propagation times for the various temperature values in logic block 16 are generated under controlled conditions. These propagation times are generated experimentally by subjecting the chip through a range of temperature values and determining the corresponding propagation delay times. Other variables, such as voltage are kept constant throughout this process. The experimental range includes temperature values above which and below which the chip will fail to perform properly or crash.

A memory 18 may be coupled to logic block 16 to store the temperature values on the chip at various times. In this manner, memory 18 contains an operating history of temperature values of the chip.

Logic block 16 outputs its information to comparator 20. Comparator 20 compares the received temperature value to a range of operating temperatures for the chip. This operating range is known by the system designer and is dependent upon the operating conditions that the particular integrated circuit device can function at. This range is stored in comparator 20. Alternatively, the operating range could be stored elsewhere, such as in chip temperature monitor 10.

For example, logic block 16 determines that the chip is operating at a temperature of Y° C. Comparator 20 compares this temperature to the range of operating temperatures for the chip. If Y° C. is not within the predetermined range, comparator 20 outputs an alert signal indicating that the chip is operating outside its operating limits. The alert signal may be coupled to an annunciator which provides an audible/visual signal that the chip is operating outside its operational temperature range. This alerts a person/system monitoring the chip that a temperature problem exists.

The alert signal may be coupled to a chip or system shutdown device. The chip shutdown device receives the alert signal and proceeds to shut down the operations of all the logic functions on the chip. Similarly, a system shutdown device receives the alert signal and proceeds to shut down the operations of the system in which the chip is a part. For example, the system may consist of a printed circuit (PC) board of interconnected chips. The entire PC board may be shut down when the chip temperature of the single chip is outside its operational limits.

These shutdown devices prevent the chip from outputting erroneous results to other chips or systems. The details of the particular shutdown devices are not needed for the present invention. Any known device which accepts an alert input signal and proceeds to suspend operation of the chip(s) is suitable for use in the invention. One example may couple the alert signal to a power switch which cuts power to the chip(s).

As another alternative, comparator 20 signals other chips/systems which it communicates with so that these chips/systems can take appropriate measures to avoid using potentially erroneous information from the chip which has exceeded its operating temperature.

As a further alternative, the output alert signal from the temperature protection device is input to a control system. For example, if the alert signal indicates that the temperature is close to the upper temperature threshold, the control system tries to reduce the temperature by increasing the air flow in the enclosure containing the chip. This is done by controlling a fan(s) supplying air flow to the chip enclosure. Alternatively, if the alert signal is a shutdown signal, the control system reduces the air flow in the chip enclosure since the chip is no longer operating. Other variations of using this alert signal in conjunction with a control system are possible without departing from the concept of the invention.

Figure 3:
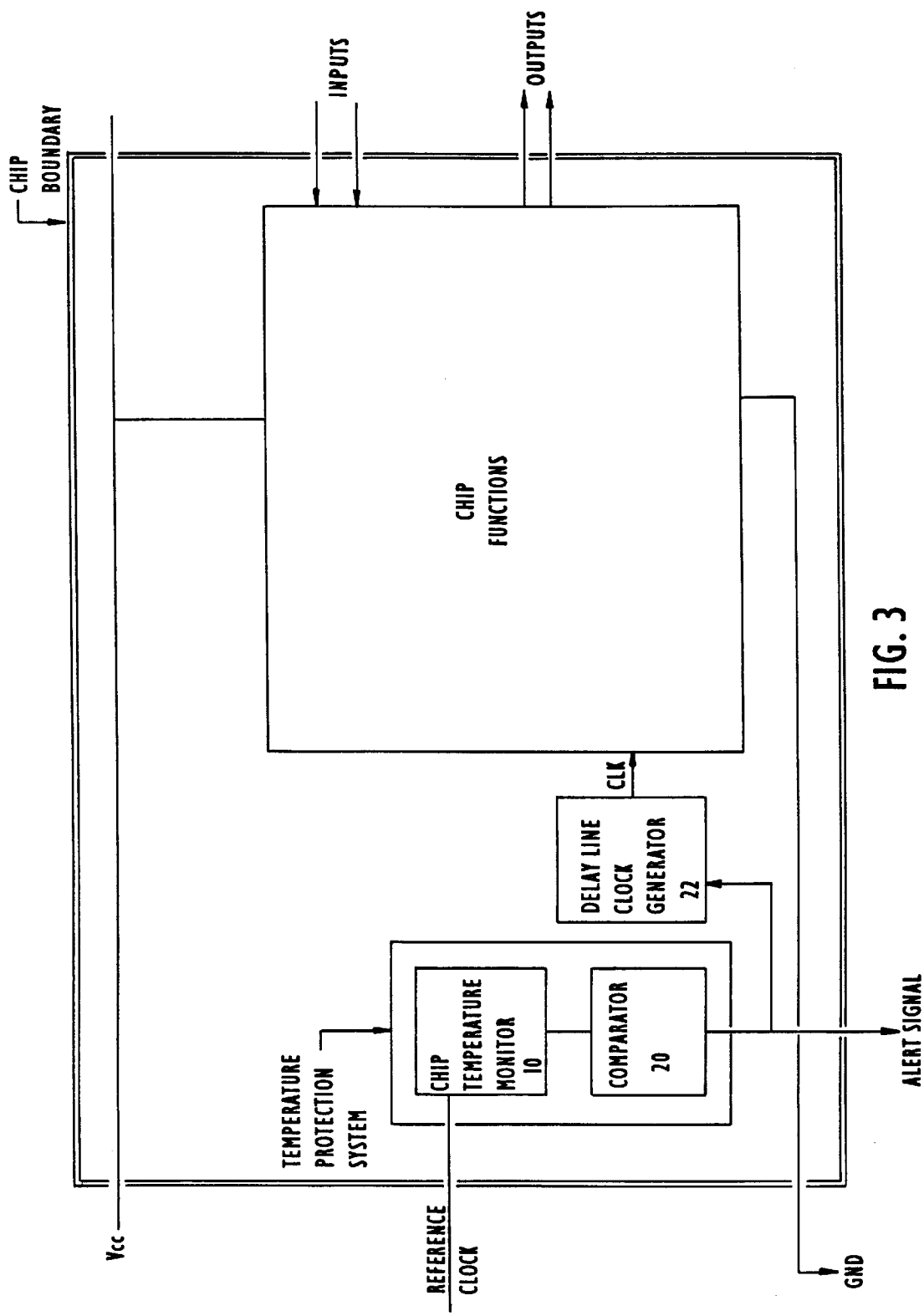
FIG. 3 is a block diagram of the chip temperature protection system within a design including a clock generator.

With reference to FIG. 3, the chip temperature protection system is shown integrated into a design which includes a delay line clock generator 22. Assume that the temperature of the chip is near its upper threshold, the alert signal is input to the delay line clock generator 22 to reduce the clock speed. The delay line clock generator 22 adjusts the optimum operating frequency of the chip logic functions by a predetermined amount based on receiving the alert signal since optimum chip conditions no longer exist. From FIG. 3, it is seen that the chip temperature protection system can be readily integrated into a digital design and does not require much increased processing or chip space. In addition, the alert signal may be used to adjust other internal timing devices or delay devices.

Described has been a system and method for protecting the operation of an integrated circuit chip based on the chip temperature. Advantages of the invention are that the protection device requires no additional semiconductor processing steps, minimal additional processing overhead and consumes little space on the chip. Another advantage of the invention is that the protection device uses only standard logic cells that can be readily integrated with the digital functions on the chip.

In this disclosure, there is shown and described only the preferred embodiments of the invention, but, as aforementioned, it to be understood that the invention is capable of use in various other combinations and environments and is capable of changes or modifications within the scope of the inventive concept as expressed herein.

What is claimed is:

1. An integrated circuit temperature protection system comprising:

a delay line contained on a chip, the delay line comprising a plurality of serially connected delay cells;

a counter coupled to the delay line for measuring propagation time of a signal through the delay line;

a temperature detector coupled to the counter for correlating the signal propagation time to a chip temperature and for generating a signal representing the chip temperature; and a comparator coupled to the temperature detector for comparing the chip temperature to a predetermined operating range.

2. The integrated circuit temperature protection system of claim 1, wherein each delay cell comprises a pair of serially connected inverters.

3. The integrated circuit temperature protection system of claim 1, wherein each delay cell comprises a repeating pattern of logic gates.

4. The integrated circuit temperature protection system of claim 1, wherein the comparator is operative for outputting a second signal indicating that the chip temperature is outside the predetermined operating range.

5. The integrated circuit temperature protection system of claim 4, wherein the second signal is output to devices which communicate with the chip.

6. The integrated circuit temperature protection system of claim 4, wherein the second signal is output to a control system.

7. The integrated circuit temperature protection system of claim 4, wherein the second signal is output to a device which shuts down or suspends operation of the chip.

8. The integrated circuit temperature protection system of claim 4, wherein the second signal is output to a clock generator.

9. The integrated circuit temperature protection system of claim 1, wherein the comparator is operative for outputting a second signal when the chip temperature is within the predetermined operating range.

10. The integrated circuit temperature protection system of claim 1, wherein the operating range has an upper limit and a lower limit, and the comparator is operative for outputting a second signal when the chip temperature is within a predetermined value of either the upper limit or lower limit.

11. A method of protecting an integrated circuit comprising the steps of:

a) passing a signal through N serially connected delay cells;

b) measuring propagation time of the signal through the N cells;

c) correlating the propagation time to a chip temperature and outputting a signal representing the chip temperature; and d) comparing the chip temperature to a predetermined range of temperature values.

12. The method of claim 11, further comprising the step of:

e) outputting a signal when the chip temperature is outside the predetermined range.

13. The method of claim 11, further comprising the step of:

e) outputting a signal when the chip temperature is within the predetermined range.

14. An integrated circuit temperature protection system comprising:

a delay line contained on a chip, the delay line comprising a plurality of serially connected delay cells wherein propagation delay time of the delay cells varies with temperature;

a reference clock coupled to the delay line for supplying an input signal to the delay line;

a counter coupled to the delay line for measuring propagation time of a signal through the delay line;

a temperature detector coupled to the counter for correlating the signal propagation time to a chip temperature and for generating a signal representing the chip temperature; and a comparator coupled to the temperature detector for comparing the chip temperature to a predetermined operating range, wherein the comparator is operative for outputting a first signal indicating that the chip temperature is outside the predetermined operating range, the operating range having an upper limit and a lower limit.

15. The integrated circuit temperature protection system of claim 14, wherein each delay cell comprises a pair of serially connected inverters.

16. The integrated circuit temperature protection system of claim 14, wherein the comparator is operative for outputting a second signal when the chip temperature is within the predetermined operating range.

17. The integrated circuit temperature protection system of claim 14, wherein the comparator is operative for outputting a second signal when the chip temperature is within a predetermined value of either the upper limit or lower limit.

18. The integrated circuit temperature protection system of claim 14, wherein the first sign al is output to devices which communicate with the chip.

19. The integrated circuit temperature protection system of claim 14, wherein the first signal is output to a control system.

20. The integrated circuit temperature protection system of claim 14, wherein the first signal is output to a device which shuts down or suspends operation of the chip.

21. The integrated circuit temperature protection system of claim 14, wherein the first signal is output to a device which adjusts the timing on the chip.

22. An integrated circuit temperature protection system comprising:

a delay line comprising a series of repetitive delay elements;

a first device for measuring signal propagation delay through the delay line and for computing the delay of an individual delay element;

a temperature detector coupled to the first device for correlating the delay of an individual delay element to a chip temperature and for generating a signal representing the chip temperature;

control logic coupled to the temperature detector for generating a control signal based on the chip temperature; and a clock generator configured to generate a clock signal, based on the control signal.

23. The integrated circuit temperature protection system of claim 22, wherein the control logic is configured to turn off other systems or integrated circuit functions.

24. The integrated circuit temperature protection system of claim 22, wherein the control logic is configured to turn on other systems or integrated circuit functions.

25. The integrated circuit measurement system of claim 22, wherein the control logic is configured to adjust the operating speed of an internal circuit parameter or external device.

* * * * *

UNITED STATES PATENT AND TRADEMARK OFFICE
CERTIFICATE OF CORRECTION

PATENT NO. : 5,943,206
DATED : August 24, 1999
INVENTOR(S) : Ian Crayford

It is certified that error appears in the above-identified patent and that said Letters Patent is hereby corrected as shown below:

```
Column 6, line 63
```
In the claims, in the Claim 18, line 2, change "sign al" to --signal--.

Signed and Sealed this

Fourth Day of January, 2000

Attest:

Attesting Officer

*Acting Commissioner of Patents and Trademarks*